No. 876,853.

PATENTED JAN. 14, 1908.

P. A. WILLE.
PISTON.
APPLICATION FILED JUNE 26, 1907.

WITNESSES
E. G. Bromley
C. W. Fairbank

INVENTOR
Paul A. Wille
BY Munn & Co
ATTORNEYS

UNITED STATES PATENT OFFICE.

PAUL ALTON WILLE, OF NEW YORK, N. Y.

PISTON.

No. 876,853.    Specification of Letters Patent.    Patented Jan. 14, 1908.

Application filed June 26, 1907. Serial No. 380,902.

*To all whom it may concern:*

Be it known that I, PAUL ALTON WILLE, a citizen of the United States, and a resident of the city of New York, borough of Brooklyn, in the county of Kings and State of New York, have invented a new and Improved Piston, of which the following is a full, clear, and exact description.

This invention relates to certain improvements in pistons adapted for use in engines, pumps and the like, and especially adaptable in connection with cylinders which have become worn or irregular through use. Particularly in internal combustion engines the cylinder often becomes gouged or worn out at one side thereof, due to the thrust of the piston, and the cylindrical packing rings no longer fit the wall of the cylinder, thus permitting of an escape of the gases to the rear side of the piston.

My improved piston may be manufactured in the form illustrated, or an old and worn piston having the ordinary packing rings thereon may be readily modified to incorporate my invention. The piston as thus constructed or modified will fit a cylinder with any irregularity and take on the form of the cylinder and fit the particular curvature thereof. The packing of the piston may be placed in position while the piston is within the cylinder, and may be inserted to hold the flexible packing band in engagement with the cylinder with any desired degree of compactness.

The invention consists in certain features of construction and combinations of parts, all of which will be fully set forth hereinafter and particularly pointed out in the claims.

Figure 1:
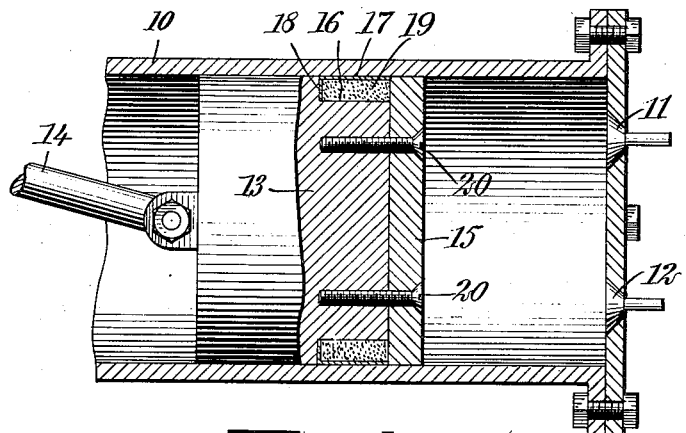
Figure 2:
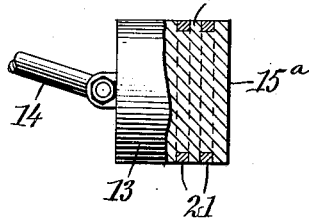
Figure 3:
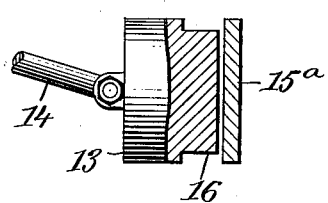

Reference is to be had to the accompanying drawings, forming a part of this specification, in which similar characters of reference indicate corresponding parts in all the figures, and in which Figure 1 is a longitudinal section through a cylinder and piston, the latter being constructed in accordance with my invention; Fig. 2 is a longitudinal section through an ordinary form of piston adaptable for modification to incorporate my invention therein; and Fig. 3 is a longitudinal section through the piston shown in Fig. 1 after having been modified in preparation of the incorporation of my invention.

The cylinders of pumps and engines, particularly those used in connection with pistons pivotally connected to their piston rods, often become gouged or worn out along one side thereof, due to the side thrust of the pistons, and as the packing rings ordinarily employed upon pistons are cylindrical in form, the insertion of new packing rings in place of the old worn ones will not prevent the escape of gas past the piston.

My improved piston is adaptable for use with any form of cylinder, as, for instance, the cylinder 10 shown in Fig. 1, the cylinder being normally provided with inlet and exhaust valves 11 and 12. Within the cylinder is mounted a piston having a main body portion 13 pivotally connected to the piston rod 14, which latter connects to the crank of the pump or engine. As the piston is moved under the pressure of the expanding steam or gas, and toward the crank, the resistance to the movement of the piston rod 14 is not in a direct line axially with the cylinder, and, therefore, a side thrust is given to the piston which causes it to engage with the cylinder with greater force upon one side than upon the other. The same is true when the piston is employed in a pump, only the greatest side thrust is exerted when the piston is returning to eject the contents of the cylinder. To construct the piston so as to fill out these unevennesses worn in the cylinder, I provide a detachable cap 15 of the full size of the piston and comprising a simple circular plate. The top of the cylinder is provided with an annular groove 16 intermediate the ends thereof and having one side thereof closed by the plate 15. Within the annular groove I provide an annular band 17, preferably formed of thin copper and of a length considerably greater than the length of an ordinary piston ring. The copper band at one end thereof is provided with an inwardly-directed flange 18 which fits against the shoulder at one end of the annular recess, and the other end of the band lies closely adjacent the plate 15. In the annular recess between the copper band and the body of the piston I provide a filling material 19, of asbestos fiber, steel wool, or any other suitable non-combustible, resilient material. This filling material is inserted after the band 17 is placed in position and before the plate 15 is fastened in place. The filling material is tamped in until the band is forced outward against the wall of the cylinder to fill all of the inequalities and unevennesses thereof, the sheet of copper forming the band being readily bent to the desired position by internal pressure. The cap or end plate 15 is then placed in position and secured there by any suitable means, as, for instance, screws 20, and the piston is ready for use.

The piston may be constructed as above described for use in new engines, but is especially adapted for use in engines which have become worn to a considerable extent. The piston may be readily constructed from an old and common form of piston, as, for instance, that illustrated in Fig. 2. If the cylinder in which the piston illustrated in this figure becomes so worn that the piston rings 21 no longer fit the cylinder due to the irregularities in the form of the latter, I remove the piston from the cylinder and saw off the end portion 15ª to form the plate illustrated in Fig. 3. The annular flange 22 lying between the two piston rings is thus broken away or removed in any other suitable manner, and the parts then assume the form illustrated in Fig. 3. A copper band of the type illustrated in the piston in Fig. 1 is then secured about the annular recess formed by the removal of the piston rings and annular flange 22, the packing inserted, and the plate 15ª secured in place to form the piston constituting my invention and illustrated complete in Fig. 1.

Various changes in the construction may be made within the scope of the appended claims without departing from the spirit of my invention.

Having thus described my invention, I claim as new and desire to secure by Letters Patent:

1. A piston having an annular recess in the body portion thereof, a thin sheet metal band forming the outer wall of said recess, a resilient packing in engagement with the rear side of said band, and detachable means secured to the body of said piston for closing the end of said recess and retaining the packing in position.

2. A piston having an annular recess in the body portion thereof, a thin sheet metal band forming the outer wall of said recess, a packing in engagement with the rear side of said band, and a plate forming the end of the piston and closing the end of said annular recess.

3. A piston having an annular recess in the body portion thereof, a thin sheet metal band forming the outer wall of said recess, a packing in engagement with the rear side of said band, and a detachable plate forming the end of the piston and closing the end of said annular recess.

4. A piston having a detachable plate forming the end thereof and having an annular recess encircling the piston adjacent said plate, a thin flexible sheet metal band forming the outer wall of said recess and having an inwardly-directed flange at one end thereof, and a resilient packing within said recess and between said band and the body of the piston, said packing serving to hold the band outward against the cylinder irrespective of the irregularities in the latter.

In testimony whereof I have signed my name to this specification in the presence of two subscribing witnesses.

PAUL ALTON WILLE.

Witnesses:
GEO. H. WELLS,
J. GEORGE SUSTMANN.